United States Patent
Ntofon et al.

(10) Patent No.: US 10,320,647 B2
(45) Date of Patent: Jun. 11, 2019

(54) EVALUATION OF NETWORK CONDITIONS

(71) Applicant: BRITISH TELECOMMUNICATIONS PUBLIC LIMITED COMPANY, London (GB)

(72) Inventors: Okung Ntofon, London (GB); Siddhartha Shakya, London (GB); Gilbert Owusu, London (GB); Jonathan Malpass, London (GB); Alistair McCormick, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/751,296

(22) PCT Filed: Aug. 24, 2016

(86) PCT No.: PCT/EP2016/070003
§ 371 (c)(1),
(2) Date: Feb. 8, 2018

(87) PCT Pub. No.: WO2017/036886
PCT Pub. Date: Mar. 9, 2017

(65) Prior Publication Data
US 2018/0234324 A1 Aug. 16, 2018

(30) Foreign Application Priority Data
Sep. 4, 2015 (EP) .................................. 15250017

(51) Int. Cl.
H04L 12/26 (2006.01)
H04L 12/24 (2006.01)
G06F 11/34 (2006.01)

(52) U.S. Cl.
CPC .......... *H04L 43/12* (2013.01); *H04L 41/0695* (2013.01); *H04L 41/142* (2013.01);
(Continued)

(58) Field of Classification Search
CPC ......... H04L 43/12; H04L 43/04; H04L 43/10; H04L 43/16; H04L 41/142; H04L 41/0695; H04L 41/046; G06F 11/34
See application file for complete search history.

(56) References Cited

U.S. PATENT DOCUMENTS 7,401,012 B1 7/2008 Bonebakker et al.
8,874,732 B1 * 10/2014 Sukumaran ......... H04L 41/5038
709/200

FOREIGN PATENT DOCUMENTS

EP 2 555 470 2/2013

OTHER PUBLICATIONS

International Search Report of PCT/EP2016/070003, dated Oct. 20, 2016, 4 pages.
(Continued)

Primary Examiner — Ajay Cattungal
(74) Attorney, Agent, or Firm — Nixon & Vanderhye PC

(57) ABSTRACT

Information received from disparate individual monitors that are concurrently measuring a predetermined property of a predetermined resource in a network are compared in a reliability computation engine to compute a metric of the degree of similarity between their measurements, and thus to determine a measure of the reliability of one or more of the individual monitors. This information can be used by a provisioning engine to select or reject individual resources for use in meeting service requirements on the basis of the reliability of the reports of their performance, as well as the reported performance itself. Monitors identified as unreliable can also be reported to a fault diagnosis function.

12 Claims, 4 Drawing Sheets

(52) U.S. Cl.
CPC .............. *H04L 43/04* (2013.01); *H04L 43/10* (2013.01); *H04L 43/16* (2013.01); *G06F 11/34* (2013.01); *H04L 41/046* (2013.01)

(56) References Cited

OTHER PUBLICATIONS

Bartlett, et al., "Understanding passive and active service discovery", IMC '07 ACM, San Diego, Oct. 24, 2007 (14 pages).

\* cited by examiner

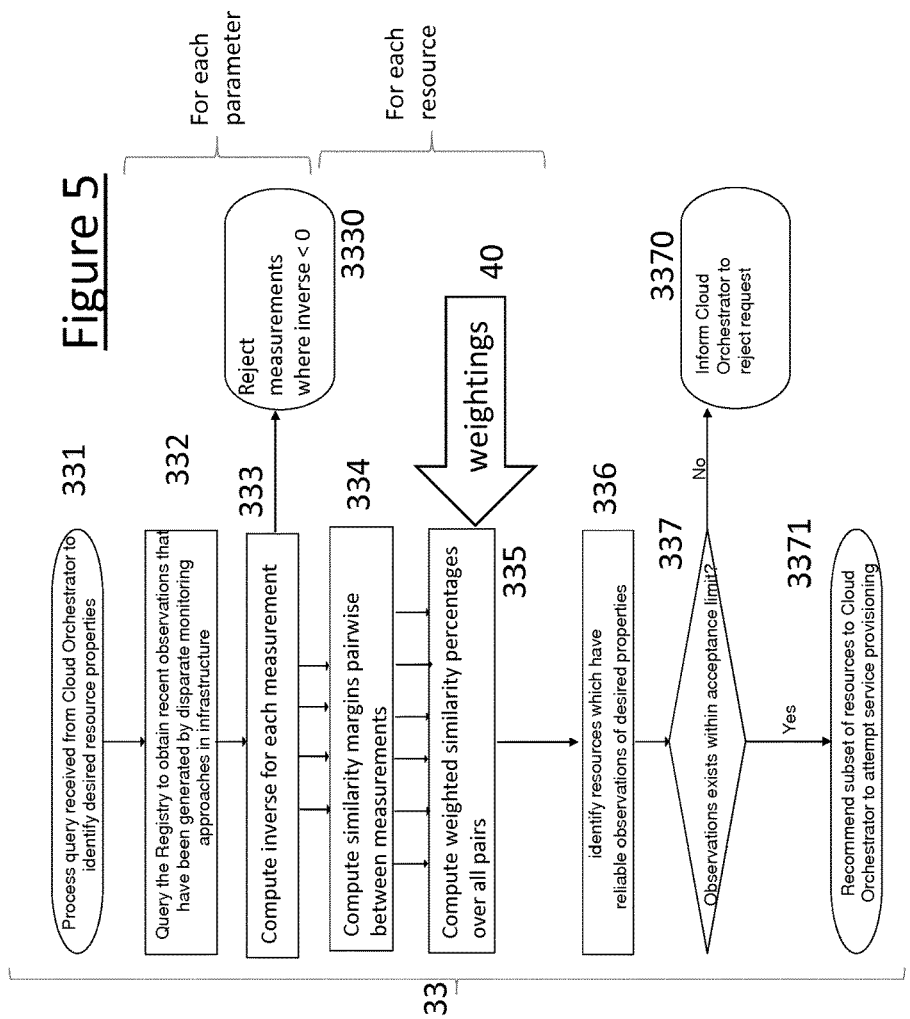
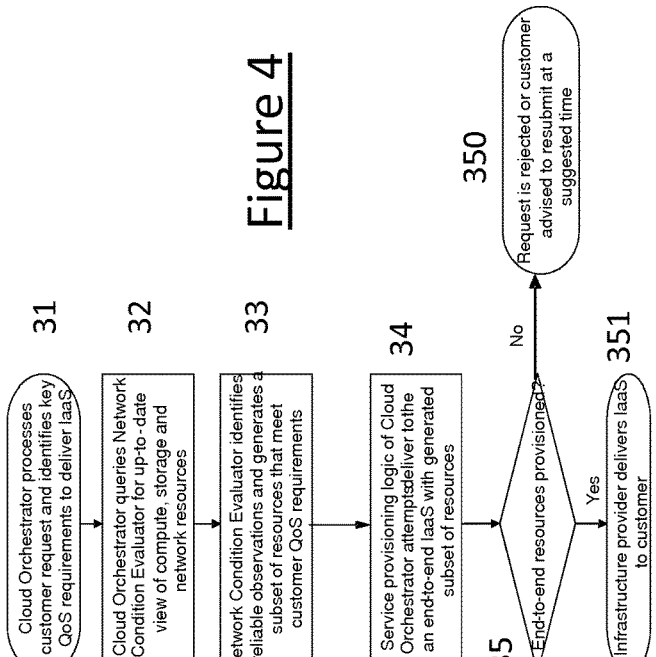

EVALUATION OF NETWORK CONDITIONS

This application is the U.S. national phase of International Application No. PCT/EP$_{2016/070003}$ filed Aug. 24, 2016, which designated the U.S. and claims priority to EP 15250017.9 filed Sep. 4, 2015, the entire contents of each of which are hereby incorporated by reference.

BACKGROUND AND SUMMARY

This invention relates to telecommunications, and in particular to the evaluation of the condition of a telecommunications network infrastructure.

In information/communications technology (ICT), utility computing relies on on-demand provisioning of resources to deliver software, platforms, and networked infrastructures to customers, typically on a pay-as-you-use model. This concept has been facilitated by the emergence of the cloud computing paradigm, and the fastest-growing segment of the public cloud services market deals with the on-demand provisioning of networked infrastructures, known as Infrastructure-as-a-Service (IaaS). To successfully deliver Infrastructure-as-a-Service with high Quality-of-Service (QoS), infrastructure providers must deploy intelligent and cost-effective monitoring frameworks that ensure accurate and up-to-date visibility of operational properties of the resources in the underlying cloud infrastructure i.e. compute, storage, and network resources.

It is known, for example from U.S. Pat. No. 8,874,732 (Sukumaran) to compare real data with a simulator using past data to identify rogue results. However, this relies on prior measurements being a reliable predictor of current conditions, as may be the case in monitoring properties such as data or energy usage by end users, for auditing of billing software etc. This may identify abnormal activity on the account, but assumes that the measurements themselves are reliable.

This invention applies to the deployment of disparate monitoring technologies and approaches in a networked infrastructure. This is a key research and innovation area as the Internet and other networked applications and services have become increasingly important in our everyday activities.

It is common practice for infrastructure providers to deploy a number of disparate monitoring technologies to observe the same properties of a single resource type. There are several reasons for this. Firstly, the underlying cloud infrastructure may have resources from multiple vendors with customized implementations of standardized monitoring protocols or with proprietary monitoring technologies. Secondly, it allows for a more robust monitoring framework to be deployed, such that the infrastructure provider always has a means to capture an up-to-date view of the operational properties of its resources. Thirdly, it ensures a cost-effective monitoring framework, as one monitoring technology could be more accurate compared to other deployed technologies, but also more operationally expensive, and therefore deployed less widely.

The deployment of a number of disparate monitoring technologies to observe the same properties of a single resource type could be based on a simultaneous configuration where each technology is operational at the same time. It could also be based on a complementary configuration where each technology is operational in different ways. Infrastructure providers tend to deploy a combination of active monitoring where probes actively poll resources for information, passive monitoring where information is obtained by monitoring the applications running on the resources in the infrastructure, and through estimations that are based on theoretical models. Infrastructure providers receive the most accurate information from active monitoring approaches; however, this is the most expensive approach, and also the most intrusive approach as the monitoring probes tend to compete with customers for resources e.g. monitoring traffic competing with customer traffic for capacity in network links.

It is known, for example from U.S. Pat. No. 7,401,012 (Bonebakker) and EP2555470 (Thomson) to characterise a computer system workload by coordinating a number of independent measurement inputs. However, as the individual measurements relate to different, independent, properties the resulting output is only as reliable as the individual measurements from which it is derived.

The present invention is particularly focused on determining the accuracy of information generated by disparate monitoring technologies that are observing the same operational properties of resources in the networked infrastructure. It ensures the service provisioning logic only attempts to deliver services from the pool of resources which have accurate and up-to-date information of operational properties.

It is known to synchronise the operation or deployment of active network probes to avoid interference between them, and to balance the use of active and passive monitoring in such a way that the intrusiveness of active monitoring is minimized, but the accuracy of measurements is not compromised.

However, these approaches are directed primarily to coordinating the number and activity of probes. There is therefore a requirement for infrastructure providers to validate the accuracy of the information received from active, passive, and estimation approaches. This becomes even more pertinent for deployments where these approaches are operating in a simultaneous configuration, as different measuring techniques may have different levels of accuracy or systematic errors.

The present invention is to validate the information that has been generated by disparate monitoring technologies, which have been deployed by an infrastructure provider to observe the same operational properties of resources. Instead of the measures of a given network element using the various techniques simply being collected and processed independently, they are collated into a single, more reliable measure. Our invention focuses on establishing the accuracy of the information generated by monitoring technologies and validating the trustworthiness of deployed monitoring probes.

The present invention is able to function in a network infrastructure that uses both active and passive monitoring, and also estimations based on theoretical models. It focuses on establishing the similarity between the information generated by disparate monitoring technologies as a means of validating the accuracy of the generated information and also as a means of updating the infrastructure provider's view of reliable monitoring probes.

The present invention accordingly provides, in a first aspect, a method for determining a measure of reliability of one or more individual monitors that concurrently measure a predetermined property of a predetermined resource in a network, by taking a reference measurement from a first monitor, taking one or more further measurements using further monitors, computing a metric of the degree of similarity between the reference measurement and the further measurements, and deriving values for reliability of the monitors from the similarity metric.

The present invention accordingly provides, in a second aspect, a networked component adapted to determine a measure of reliability of one or more individual monitors that concurrently measure a predetermined property of a predetermined resource in a network, having a reliability computation engine for determining a reliability measurement for a property of a resource, having measurement receivers by taking measurements from a plurality of monitors, a comparator for determining the difference between a reference measurement and each of the further measurements, and a reliability value generator for deriving a reliability value for the measured property of the resource from the said differences.

The invention can be integrated into any resource or service provisioning system such as a cloud service orchestrator, networked service broker, or network resource provisioning system. It exposes an intelligent framework that validates the accuracy of monitoring information by computing a metric called the Weighted Similarity Percentage (WSP); this metric is used to compare the information received from disparate monitoring technologies.

In this way the invention is enabled to determine the reliability of disparate monitoring technologies and also to validate the accuracy of information received from these technologies. The service provisioning logic uses the WSP to identify the most appropriate subset of resources in the networked infrastructure to deliver high-quality Infrastructure-as-a-Service to customers. The invention also exposes functionalities to periodically determine the trustworthiness of monitoring probes in the networked infrastructure. The state-of-the-art in the area of networked infrastructure monitoring is mainly focused on methods to optimize the operation of active monitoring of resources i.e. prevent collisions between active probes in the networked infrastructure, reduce the overhead of active probing by leveraging more sophisticated passive monitoring techniques, and methods for intelligently and dynamically distributing active probes across the cloud infrastructure.

The present invention accordingly provides, in a third aspect, a computer program element comprising computer program code to, when loaded into a computer system and executed thereon, cause the computer to perform the steps of the method set out above.

A preferred embodiment of the present invention will now be described, by way of example only, with reference to the accompanying drawings, in which:

BRIEF DESCRIPTION OF THE DRAWINGS

FIG. 3 is a schematic diagram illustrating some of the functional elements of the network condition evaluator of FIG. 2 in more detail;

FIG. 4 is a flowchart giving a High-level representation of a service provisioning process operating according to an embodiment of the invention;

FIG. 5 is a flowchart giving a High-level representation of the process operated by the reliability Computation Engine as part of the process of FIG. 4;

DETAILED DESCRIPTION OF THE INVENTION

Figure 1:
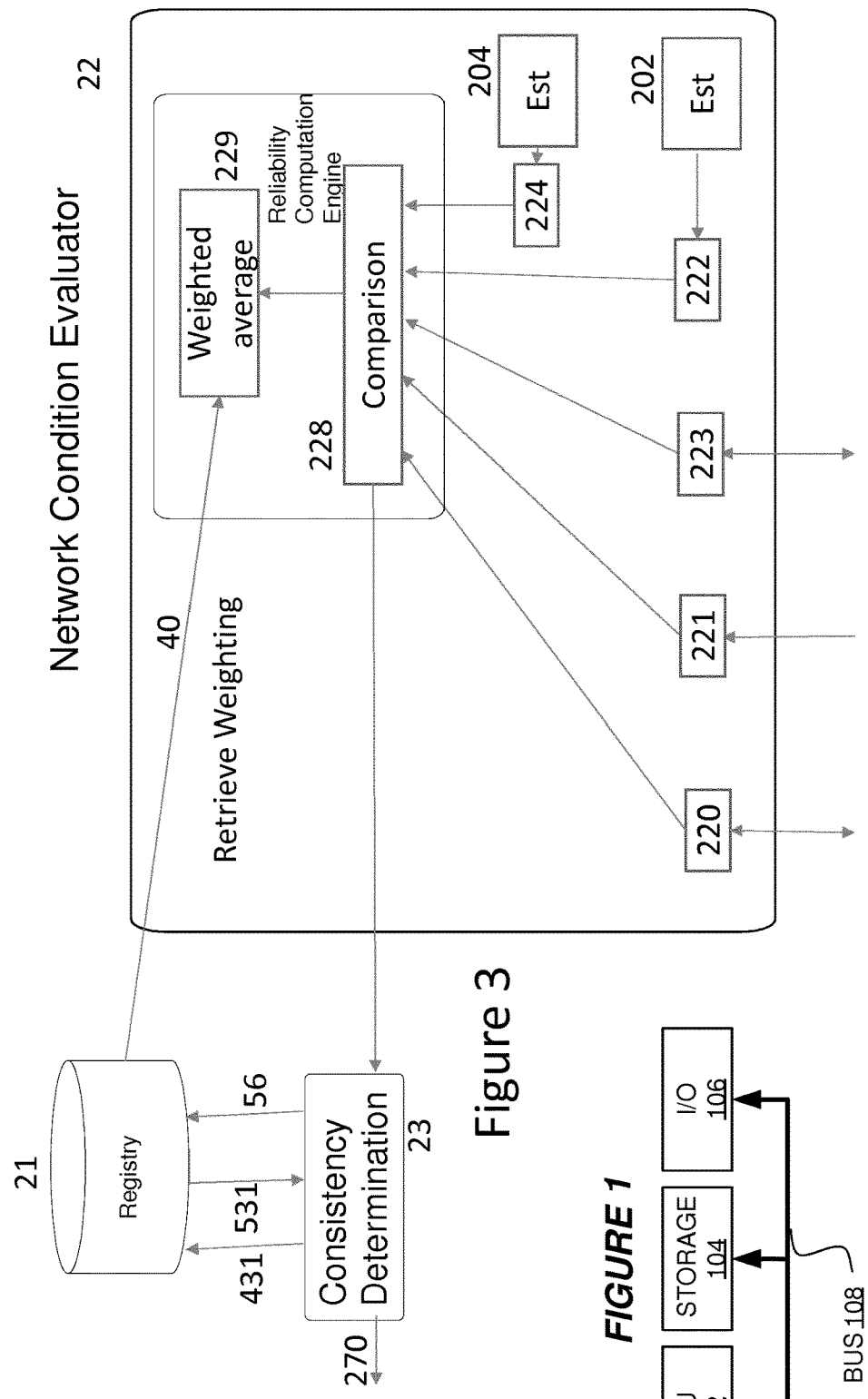
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
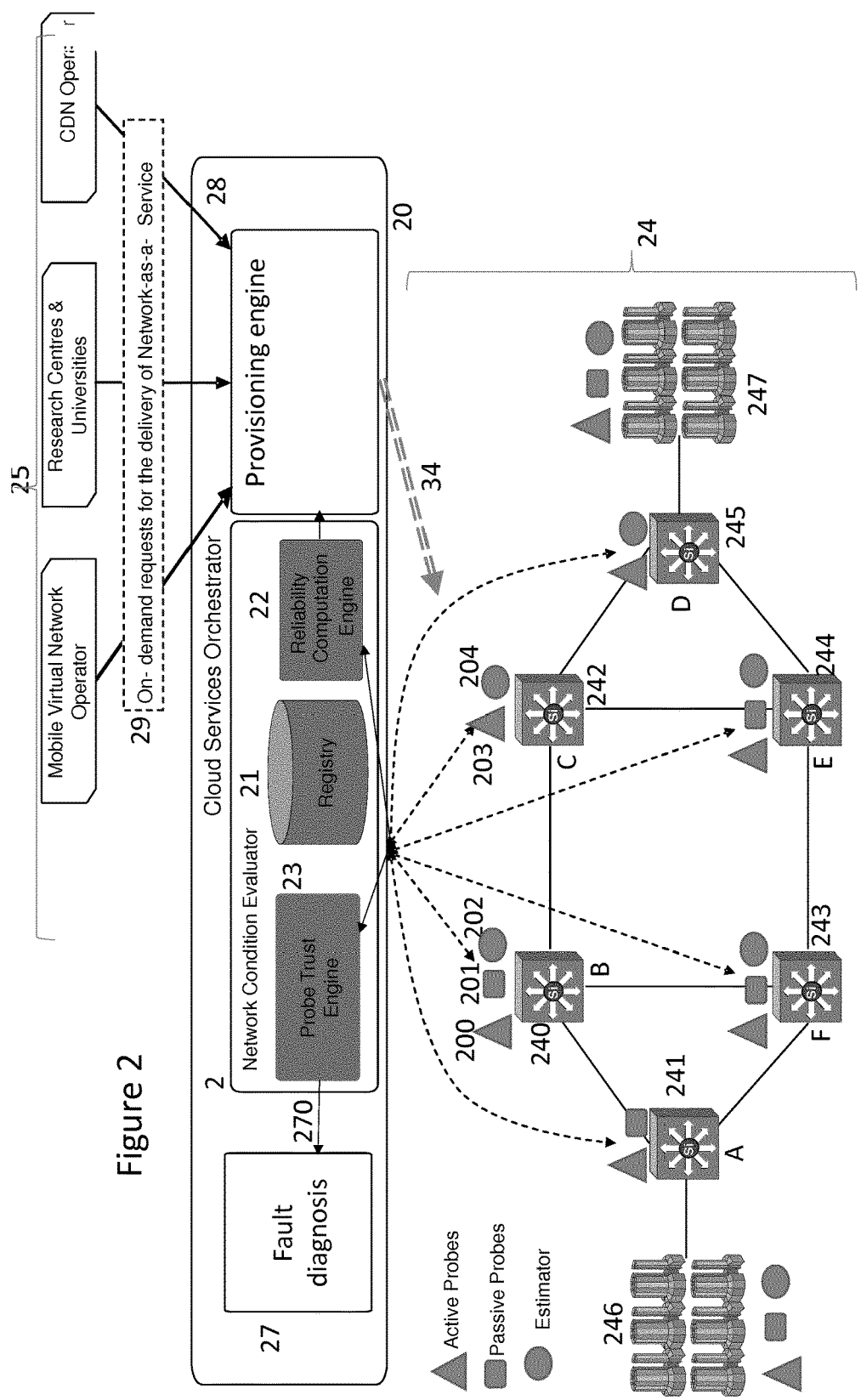
FIG. 2 is a schematic diagram depicting a cloud networked infrastructure incorporating a network condition evaluation system for operation according to an embodiment of the invention.

FIG. 2 depicts a high-level architectural view of a networked infrastructure (indicated generally at 24), with individual components 240, 241, 242 . . . etc, each monitored by one or more probes or monitors 200, 201, 202, 203, 204 . . . . etc. These probes use a variety of operating technologies (also hereinafter referred to as monitoring, or probe, technologies) and, in general, not all available probe technologies will be used at each element of the infrastructure.

A Cloud Services Orchestrator 20 is used to provision computing, storage, and network resources for the delivery of Infrastructure-as-a-Service (IaaS) in response to requests delivered through a customer interface 29 from individual customers 25.

A network condition evaluation system 2 operable according to this embodiment of the invention is integrated into the Cloud Services Orchestrator 20. The network condition evaluation system 2 provides the Cloud Services Orchestrator 20 with a unified interface to various monitoring probes 200, 201, 202 etc., deployed in the networked infrastructure 24. Its main components are a Registry 21, a Reliability Computation Engine 22, and a Probe Trust Engine 23.

The Registry 21 provides persistent storage of information generated by the disparate monitoring technologies. This information is queried by the Reliability Computation Engine 22 for service provisioning, and by the Probe Trust Engine 23 for periodic validation of the monitoring probes.

The Reliability Computation Engine 22 contributes towards service provisioning by determining whether individual monitoring probes e.g 200, 201, 202, 203 . . . are generating accurate information about resource properties. It also houses logic that is used to generate the most appropriate subset of resources which the service provisioning logic considers for the delivery of end-to-end services that satisfy customer requirements.

FIG. 3 illustrates the Network Condition Evaluation System 2 and, in particular, the Reliability Computation Engine 22 thereof in more detail. It should be noted that the various components depicted are functional elements, which may be embodied in software. The Reliability Computation Engine 22 comprises a number of measurement interfaces 220, 221, 222, 223, 224 etc., corresponding with the individual monitoring probes 200, 201, 202, 203, 204, etc. Although depicted as separate items, it will be appreciated that this is a functional distinction, and in practice communication with the different probes may be operated by fewer interfaces (or indeed just one) operating in a time division (or other multiple access) mode. It will be noted that some of the interfaces 220, 223 are two-way as they co-operate with active probes, that is to say the evaluator polls the relevant probes, whereas other interfaces 221 passively receive data from the network. Estimating inputs (e.g 222, 224) take readings from a network model 202, 204 associated with the respective network resources (as depicted schematically in FIG. 2) but not necessarily located therein.

The various inputs are compared in a comparison engine 228, to identify differences between the measured properties. These values are then averaged in a weighted average calculator 229, using weightings retrieved (step 40) from the registry 21.

The Cloud Services Orchestrator 20 (shown in FIG. 2) processes customer requests for Infrastructure-as-a-Service (IaaS) received through an interface 29, identifies the resource types relevant to the request and determines the QoS requirements specified by the customer 24. For example, a customer request for Network-as-a-Service will require network resources such as routers and switches, and QoS requirements such as loss rate and latency on the network links interconnecting the routers and switches of the required connections. The resource types and QoS requirements for the customer request are forwarded to the network condition evaluation system 2. The network condition evaluation system uses the logic in the Reliability Computation Engine 22 to query the Registry 21 for information on the operational properties of resources matching the resource types that are specified in the customer request. This query is restricted to the properties which are specified by the customer in its QoS requirements e.g. loss rate and latency of the network links interconnecting routers and switches.

To facilitate service provisioning, the Reliability Computation Engine 22 identifies which resources have reliable information stored in the Registry 21, and computes a Weighted Similarity Percentage (WSP) which is an indication of the similarity between the information generated by disparate monitoring technologies 200, 201, 202 that are observing the same property of a resource 240. High WSP values indicate the disparate monitoring technologies have generated similar observations and the Reliability Computation Engine considers such observations to be accurate. Any resources with low WSP values are considered to be ineligible for delivering the service to the customer. The resources that satisfy both reliability and QoS constraints are forwarded to the service provisioning logic 28 which attempts to set up an end-to-end service from this pool of resources. The acceptance limit of WSP values can be defined by the infrastructure provider to ensure it always delivers high quality services. It can also be specified by customers with other QoS requirements. For example, a customer request could specify a minimum WSP of 80% across the disparate monitoring technologies with QoS requirement of at least 20 Mbps free capacity on network links interconnecting routers and switches.

The Probe Trust Engine 23 performs a periodical update (431, 531, 56) of the records of trustworthy monitoring probes in the networked infrastructure. This component of the network condition evaluation system 2 houses a training algorithm that is used to determine how often each monitoring probe has generated inaccurate information. This trend is used to dynamically optimize the computation of WSP values by assigning a low weighting to values delivered by unreliable monitoring probes until such probes become more trustworthy. When probes are identified as untrustworthy, the probe trust engine 23 can also generate reports 270 for transmission to a fault diagnosis processor 27 to analyse the nature of the anomalous measurements or prompt the infrastructure provider to investigate untrustworthy monitoring probes for possible faults or damages.

The flowchart depicted in FIG. 4 presents a high-level view of the service provisioning procedure with the network condition evaluation system 2 co-operating with the service provisioning engine 28.

Customer requests are received at the interface 29 and forwarded to the provisioning engine 28, which processes the customer request and identifies the computing, storage and network resource types needed to deliver the requested service (step 31). The Cloud Services Orchestrator 20 then queries the Network Condition Evaluation System 2 for an up-to-date view of the compute, storage and network resources of the networked infrastructure 24 (step 32).

The network condition evaluator/evaluation system 2 then identifies a subset of the available resources that will meet the user's requirements (step 33). This step is depicted in more detail in FIG. 5.

In identifying which resources are suitable, a measure of the reliability of the measurements made by the probes of resources parameters, referred to herein as the Weighted Similarity Percentage (WSP), is computed. This calculation is performed as follows, using the following parameters and variables:

T is the set of reporting periods during which monitoring probes generate and store information P is the set of disparate monitoring probes deployed in the networked infrastructure R is the set of compute, storage, and network resources in the networked infrastructure K is the subset of all resources i.e. $K \subseteq R$ that have satisfied the reliability acceptance constraint $SP_{ijrt}$ is the 2-combination similarity percentage; it is a measure of the similarity between the information generated by a pair of disparate probes $(i,j) \in P$ both monitoring a resource $r \in R$ at a reporting period $t \in T$ $WSP_{rt}$ is the weighted similarity percentage computed for the information received by the disparate monitoring technologies for resource $r \in R$ at reporting period $t \in T$ $\beta$ is the sensitivity parameter; it is the upper limit requirement for the operational property specified in customer request as QoS requirement e.g. the maximum value for acceptable latency on network links is 5 ms.

$\psi$ is the reliability acceptance limit; it is the lower limit requirement for acceptable WSP values $\theta_{irt}$ is the information generated by monitoring probe $i \in P$ for resource $r \in R$ at reporting period $t \in T$ $\Omega_{irt}$ is the inverse of the information generated by monitoring probe $i \in P$ for resource $r \in R$ at reporting period $t \in T$ $\omega_{ij}$ is the accuracy weight for the pair of monitoring probes $(i,j) \in P$ that is used in conjunction with the 2-combination similarity percentage $SP_{ijrt}$ to compute the weighted similarity percentage parameter $WSP_{rt}$. This parameter is periodically updated by the Probe Trust Engine with stronger weights being assigned to pairs of monitoring probes $(i,j) \in P$ that generate similar and accurate information about resources.

A pseudocode representation of an algorithm that may be implemented in the Reliability Computation Engine 22 is detailed in the following steps, depicted in FIG. 5:

Step 331: Process the customer request received at time t to identify required resources $r \in R$, set the sensitivity parameter $\beta$, and set the reliability acceptance limit $\psi$ Step 332: For each monitoring probe $i \in P$ and each resource specified in the customer request $r \in R$, retrieve from the Registry 21 the information generated for the operational property relevant to the requirements of the customer at reporting time t, i.e. set the parameter $\theta_{irt}$ Step 333: For each parameter $\theta_{irt}$ that is set in the preceding step, compute the inverse at reporting time t using the expressions in Equation 1 below. This property is the difference between the actual value and the maximum acceptable value for the property in question—in other words the margin by which the observed value falls within the acceptable limit. The purpose of this step is two-fold; it enables the invention to filter resources that do not satisfy customer QoS requirements (step 3330). It also further emphasizes any differences that exist between information generated by disparate monitoring probes; particularly as the order of magnitude of generated information approaches the sensitivity parameter $\beta$ $$\Omega_{irt} = \begin{cases} \beta - \Theta_{irt} & \text{if } \beta \geq \Theta_{irt} \\ 0 & \text{otherwise} \end{cases} \quad (1)$$

Step 334: For each resource r∈R and for each pair of disparate monitoring probes (i,j)∈P that have generated information for this resource, compute the 2-combination similarity percentage at reporting time t using the expressions in Equation 2

$$SP_{ijrt} = \begin{cases} \dfrac{\Omega_{irt}}{\Omega_{jrt}} & \text{if } \Omega_{irt} < \Omega_{jrt} \\ \dfrac{\Omega_{jrt}}{\Omega_{irt}} & \text{otherwise} \end{cases} \quad (2)$$

Step 335: For each resource r∈R, compute the Weighted Similarity Percentage over the set of disparate monitoring probes at reporting time t using the expression in Equation 3; the parameter $\omega_{ij}$ is periodically generated by the Probe Trust Engine 23 (step 50) using a training algorithm as will be described later with reference to FIG. 7

$$WSP_{rt} = \sum_{(i,j) \in P} SP_{ijrt} \times \omega_{ij} \quad (3)$$

Step 336: For each resource r∈R, verify if the resource satisfies both reliability and QoS constraints $$\forall r \in R; \{r\} \cup K \text{ if } WSP_{rt} \geq \psi \quad (4)$$

Step 337: If no resources satisfy the condition specified in Equation (4), the provisioning engine 28 is given a rejection instruction (step 3370).

A simplified worked example of this process will be described later

If one or more resource does meet the requirements, the subset of eligible resources k∈K|k⊆R is advised to the service provisioning logic 28 (step 3371) which attempts to deliver an end-to-end service to the customer from this pool of eligible resources (step 34)

The service provisioning logic 28 will then attempt to configure the selected resources 24 as required to fulfil the request (step 34). If it has received a rejection request 3370, or is otherwise unable to deliver the required service (step 35) it transmit a messages by way of the interface 29 to the requesting user 25, rejecting the request, or advising the user to modify the request, for example by reducing the bandwidth requirement, or specifying a different time for the service to be provided (step 350). If all the resources are available, the service can be delivered (step 351)

The accuracy weight parameter $\omega_{ij}$ generated by the probe trust engine 23 for each pair of monitoring probes and provided to the service provisioning logic 28 is determined as follows, with reference to FIG. 7, and using the following additional parameters:

∧ is the training period: the Probe Trust Engine runs the training algorithm after every ∧ reporting period has elapsed δ is the dissimilarity threshold, it is the maximum number of times the 2-combination similarity percentage $SP_{ijrt}$ between monitoring probes i and j can be lower than the reliability acceptance limit ψ

$\varrho_{ij}$ is a consistency indicator, indicative of the number of times the 2-combination similarity percentage $SP_{ijrt}$ between monitoring probes i and j is lower than the reliability acceptance limit ψ. This parameter is reset to zero after every ∧ reporting period has elapsed The pseudocode representation of the algorithm that is implemented in the Probe Trust Engine 23 to ensure an up-to-date view of monitoring probes generating information of the same operational property of a resource is detailed in the following steps, and illustrated in FIGS. 6 and 7.

Figure 6:
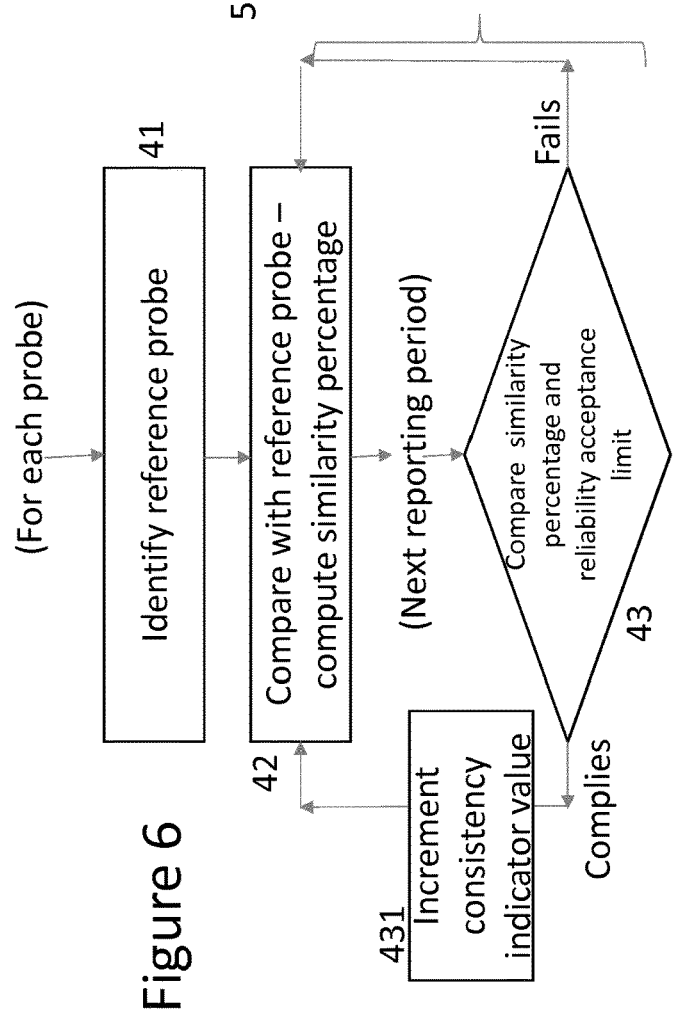
FIG. 6 is a flow chart illustrating a process for determining a consistency measure.

The steps depicted in FIG. 6 are performed periodically for each resource.

Step 41: Select the monitoring probe i∈P that is expected to generate the most accurate information about the operational property of the resource. This monitoring probe is called the reference probe and in most cases is the probe that utilizes active monitoring Step 42: For every reporting period t∈T within the interval between the penultimate and current training periods, compute the 2-combination similarity percentage $SP_{ijrt}$ between the reference probe i and every other monitoring probe j∈P that is generating information about the same operational property for the same resource Step 43: For each pair of monitoring probes (i,j)∈P where i is the reference probe, check the number of times the 2-combination similarity percentage $SP_{ijrt}$ is less than the reliability acceptance limit ψ i.e. set the consistency indicator $\varrho_{ij}$ The steps depicted in FIG. 7 take place when a trustworthiness weighting is required. For each pair of monitoring probes (i,j)∈P where i is the reference probe, retrieve the consistency indicator $\varrho_{ij}$ (step 531) and check if it less than or equal to the dissimilarity threshold δ. (Step 54)

If the parameter $\varrho_{ij}$ is less than or equal to the dissimilarity threshold (step 541), the monitoring probe j is considered to have a high to medium accuracy depending on how close the value of parameter $\varrho_{ij}$ is to the value of the dissimilarity threshold δ. If the value of the parameter $\varrho_{ij}$ is greater than the value of the dissimilarity threshold δ, the monitoring probe j is considered to have low accuracy and is therefore more untrustworthy.

Step 55: Generate the accuracy weight parameter $\omega_{ij}$ for each pair of monitoring probes (i,j)∈P where i is the reference probe. Weights are therefore assigned to pairs of monitoring probes (i,j)∈P that have generated the most similar information, and the most accurate in relation to the reference probe, within the training interval i.e. pairs of monitoring probes with the parameter $\varrho_{ij}$ less than the dissimilarity threshold. The weightings are normalised (step 555) such that $$\sum_{(i,j)\in P} \omega_{ij} = 1 \qquad (5)$$

These weightings can then be stored by the registry 21 (step 56), to be accessed by the provisioning process of FIG. 6 as required (step 40).

Figure 7:
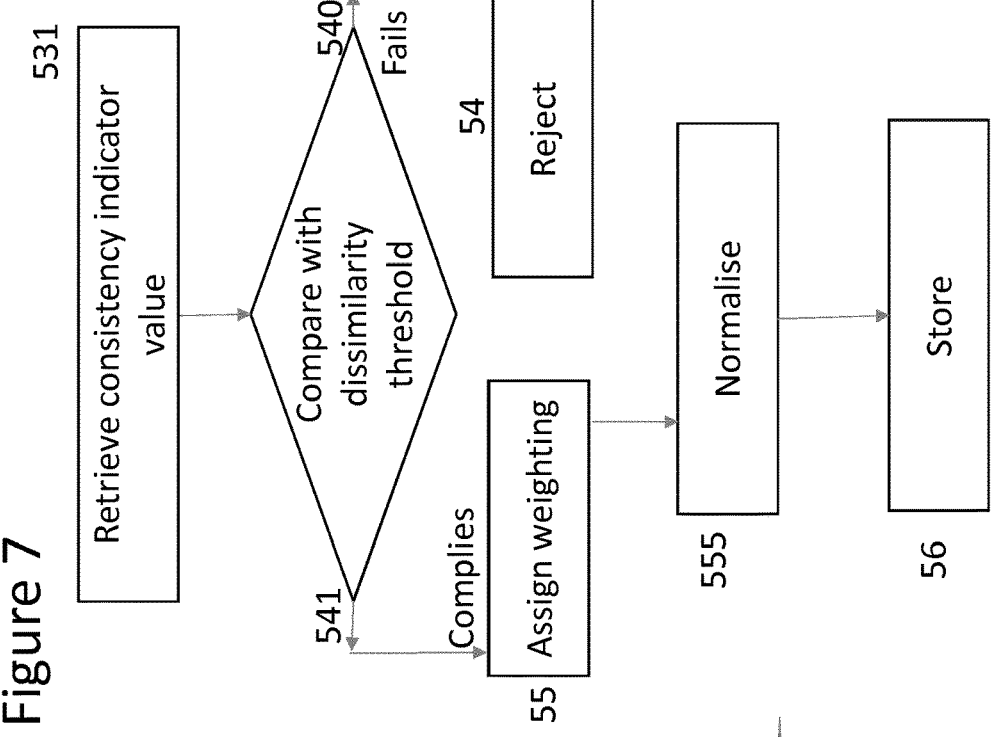
FIG. 7 is a flowchart illustrating a process for assigning a normalised weighting value.

A simplified demonstration of the process implemented in the Probe Trust Engine 23 to determine the weightings to be applied to different probe measurements, and depicted in FIGS. 6 and 7 follows.

For the purposes of illustration, we assume the infrastructure provider has deployed six monitoring probes for monitoring the same properties of its resources, namely one active probe (A), four passive probes (P1, P2, P3, P4), and one estimation based probe (E). The active probe A is selected as the reference monitoring probe, as it is likely to be the most accurate. This is used to periodically update the view of the trustworthiness of the other monitoring probes in the infrastructure. Table B.1 shows the 2-combination similarity percentage for the information generated by the monitoring probes in 24 reporting periods. The Probe Trust Engine 23 is assumed to have the following configuration enabled for the training operation:

Retraining frequency→every 12 reporting periods
Dissimilarity threshold δ→6
Reliability acceptance limit ψ→75% or 0.75
Values below the reliability acceptance limit are highlighted in table B1

After the first twelve reporting periods T1-T12, the Probe Trust Engine updates its view of the trustworthiness of the six monitoring probes using the two-combination similarity percentage values presented in Table B.1. (Step 43/431, FIG. 6) For these periods, none of the pairs of monitoring probes exceeds the configured dissimilarity threshold value (in this example, the threshold value is six failures (out of twelve periods) to achieve the acceptance limit). The pair of monitoring probes (A-P1) generates the most values that are lower than the reliability acceptance limit. This causes the Probe Trust Engine to identify the monitoring probe Passive-1 as the most unreliable probe for the following reporting periods (T13-T24).

The Probe Trust Engine now generates an accuracy weighting, as presented in Table B.2, to be used by the Reliability Computation Engine for service provisioning in the following reporting periods.

TABLE B.2

Accuracy weights generated by Probe Trust Engine

| Reporting period | T1-T12 | T13-T24 |
|---|---|---|
| Active, Passive-1 (A-P1) | 0.09 | 0.09 |
| Active, Passive-2 (A-P2) | 0.21 | 0.01 |
| Active, Passive-3 (A-P3) | 0.25 | 0.28 |
| Active, Passive-4 (A,P4) | 0.20 | 0.31 |
| Active, Estimation (A-E) | 0.25 | 0.31 |

The strength of the weights is dependent on the value of the parameter $\varrho_{ij}$ for each pair of monitoring probes i.e. the number of times the two-combination similarity percentage between monitoring probes i and j is lower than the reliability acceptance limit. Pairs of monitoring probes with lower values of the parameter $\varrho_{ij}$ are considered to be more trustworthy and are assigned higher values for the accuracy weight parameter $\omega_{ij}$.

For the reporting periods T1-T12, the pairs of (A, P3) and (A, E) are assigned the strongest weights as these do not generate any two-combination similarity percentage values that are less than the reliability acceptance limit. The pairs of monitoring probes (A, P2) and (A, P4) generate one and three values of two-combination similarity percentage respectively that are less than the reliability acceptance limit.

During the next training period i.e. after reporting periods T13-T24, the Probe Trust Engine revaluates its view of the trustworthiness of the six monitoring probes. In this case, a pair of monitoring probes i.e. (A, P2) exceeds the dissimilarity threshold by generating ten values of the two-combination similarity percentage that are less than the reliability acceptance limit. As a result, the monitoring probe P2 is considered to be very untrustworthy by the Probe Trust Engine. The Probe Trust Engine generates the accuracy weights presented in this second reporting period for service provisioning in the following reporting periods i.e. T25-T36. The pair of monitoring probes (A, P1) again generates six values that are lower than the reliability acceptance limit while the pair of monitoring probes (A, P3) generates one value lower than the reliability acceptance limit. The pairs of (A, P4) and (A-E) are assigned the strongest weights as these do not generate any two-combination similarity percentage values that are less than the reliability acceptance limit. The drastic change in the trustworthiness of the monitoring probe P2 could be due to a fault or damage and the probe trust engine 23 is arranged to detect such changes and report them to a fault diagnosis processor 27 (step 270).

A simplified worked example of the process of FIG. 4 to determine the similarity between probe readings will now be given.

Referring again to FIG. 2, this depicts a simplified enterprise networked infrastructure with high performance routers 240-245 interconnected via high speed network links. Customers 25 request the delivery of Network-as-a-Service (NaaS) through a service provisioning system 28 co-operating with the network condition evaluation system 21

The details of the customer request are as follows:
Service requirement→delivery of end-to-end connectivity between Node A (241) and Node D (245)
QoS requirement (sensitivity parameter β)→maximum CPU utilization for each node in end-to-end path must be less than or equal to 75%
Reliability acceptance limit ψ→80%

It is assumed the infrastructure provider has deployed three monitoring technologies based on active and passive monitoring, and also theoretical estimations. The active monitoring probe is considered to be the most trustworthy and the accuracy weights $\omega_{ij}$ assigned for each pair of monitoring probes (i,j)∈P are detailed below 0.8 for the pair of active-passive probes i.e. $\omega_{(active,passive)}$
0.1 for the pair of active-estimation probes i.e. $\omega_{(active, passive)}$
0.1 for the pair of passive-estimation probes i.e. $\omega_{(passive, estimation)}$ Table A.1 shows the information generated by each monitoring probe for the nodes in the networked infrastructure. It also presents the result of the inverse computations using the customer specified sensitivity parameter β=75% (Step 333 of the Reliability Computation Engine process of FIG. 5)

TABLE A.1

Information generated by monitoring probes and inverse computations

|  | Step 332 | | | Step 333 | | |
|---|---|---|---|---|---|---|
|  | Active | Passive | Estimation | Inverse Active | Inverse Passive | Inverse Estimation |
| Node A | 10 | 0 | 15 | 65 | 75 | 60 |
| Node B | 30 | 25 | 20 | 45 | 50 | 55 |
| Node C | 0 | 40 | 45 | 75 | 35 | 30 |
| Node D | 10 | 10 | 10 | 65 | 65 | 65 |
| Node E | 16 | 18 | 22 | 59 | 57 | 53 |
| Node F | 25 | 20 | 15 | 50 | 55 | 60 |

TABLE A.2

Two-combination similarity percentage for pairs of monitoring probes and the weighted similarity percentages

|  | Step 334 | | | Step 335 |
|---|---|---|---|---|
|  | $SP_{active\text{-}passive}$ | $SP_{active\text{-}estimation}$ | $SP_{passive\text{-}estimation}$ | $WSP_{node}$ |
| Node A | 0.87 | 0.92 | 0.80 | 0.87 |
| Node B | 0.90 | 0.82 | 0.91 | 0.89 |
| Node C | 0.47 | 0.40 | 0.86 | 0.50 |
| Node D | 1.00 | 1.00 | 1.00 | 1.00 |
| Node E | 0.97 | 0.90 | 0.93 | 0.96 |
| Node F | 0.91 | 0.83 | 0.92 | 0.90 |

Table A.2 shows the values obtained from the computation of the two-combination similarity percentage for the pairs of monitoring probes in the networked infrastructure using the inverse computations from Table A.1 (Step 334 of the process depicted in FIG. 5). It also presents the weighted similarity percentage computed with the accuracy weights and two-combination similarity percentage for the pairs of monitoring probes (FIG. 5, Step 335).

The invention considers the computed weighted similarity percentages presented in Table A.2 and generates the set of eligible resources for delivering the end to end service based on the customer specified reliability acceptance limit ψ=80% i.e. 0.80 (FIG. 5, Step 336).

The generated set of eligible resources is {Node A, Node B, Node D, Node E, Node F} as Node C does not satisfy the reliability acceptance constraint with a weighted similarity percentage value of 50%. The service provisioning logic attempts to deliver the end-to-end connectivity between nodes A and D by enabling only network links between nodes in this generated resource pool. The service provisioning logic assumed for this example is the selection of the shortest possible path between Nodes A and D. In this case, the invention will deliver NaaS to the customer with the network path Node A-Node E-Node F-Node D.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

TABLE B.1

Two-combination similarity percentage used by Probe Trust Engine

|  | $SP_{active\text{-}passive\text{-}1}$ | $SP_{active\text{-}passive\text{-}2}$ | $SP_{active\text{-}passive\text{-}3}$ | $SP_{active\text{-}passive\text{-}4}$ | $SP_{active\text{-}estimation}$ |
|---|---|---|---|---|---|
| T1 | 0.78 | 0.58 | 0.90 | 0.98 | 0.82 |
| T2 | 0.82 | 0.84 | 0.95 | 0.91 | 0.82 |
| T3 | 0.59 | 0.94 | 0.91 | 0.63 | 0.82 |
| T4 | 0.77 | 0.93 | 0.93 | 0.80 | 0.82 |
| T5 | 0.99 | 0.92 | 0.89 | 0.97 | 0.83 |
| T6 | 0.63 | 0.93 | 0.89 | 0.68 | 0.83 |
| T7 | 0.68 | 0.94 | 0.93 | 0.88 | 0.83 |
| T8 | 0.69 | 1.00 | 0.92 | 0.96 | 0.84 |
| T9 | 0.79 | 0.93 | 0.90 | 0.69 | 0.84 |
| T10 | 0.53 | 0.76 | 0.92 | 0.98 | 0.85 |
| T11 | 0.86 | 0.93 | 0.92 | 0.90 | 0.86 |
| T12 | 0.53 | 0.90 | 0.89 | 0.94 | 0.86 |
| T13 | 0.65 | 0.87 | 0.76 | 0.92 | 0.87 |
| T14 | 0.68 | 0.73 | 0.77 | 0.87 | 0.87 |
| T15 | 0.54 | 0.58 | 0.79 | 0.88 | 0.86 |
| T16 | 0.96 | 0.73 | 0.95 | 0.89 | 0.86 |
| T17 | 0.46 | 0.58 | 0.86 | 0.91 | 0.85 |

TABLE B.1-continued

Two-combination similarity percentage used by Probe Trust Engine

| | $SP_{active\text{-}passive\text{-}}$ | $SP_{active\text{-}passive\text{-}}$ | $SP_{active\text{-}passive\text{-}3}$ | $SP_{active\text{-}passive\text{-}4}$ | $SP_{active\text{-}estimation}$ |
|---|---|---|---|---|---|
| T18 | 0.78 | 0.58 | 0.91 | 0.92 | 0.82 |
| T19 | 0.89 | 0.58 | 0.93 | 0.94 | 0.81 |
| T20 | 0.79 | 0.58 | 0.96 | 0.96 | 0.89 |
| T21 | 0.72 | 0.79 | 0.65 | 0.98 | 0.86 |
| T22 | 0.54 | 0.58 | 0.79 | 0.87 | 0.86 |
| T23 | 0.96 | 0.73 | 0.95 | 0.89 | 0.85 |
| T24 | 0.46 | 0.58 | 0.86 | 0.91 | 0.86 |

The invention claimed is:

1. A method for determining a measure of reliability of one or more individual monitors, comprising:
   concurrently measuring a predetermined property of a predetermined resource in a network, by taking measurements of a predetermined resource using a plurality of monitors,
   selecting one of the plurality of monitors as a first monitor for obtaining live data when taking measurements,
   defining measurements taken by the first monitor when obtaining live data as reference measurements,
   determining a difference value between each of the reference measurements and corresponding measurements taken from each of the other monitors when obtaining live data, and
   deriving a value for reliability of the measured property of the resource from the difference values so determined.

2. A method according to claim 1, wherein a weighting is applied to the difference values used for a current cycle of measurements, the weighting being derived from values derived using the difference values in one or more previous cycles of measurements.

3. A method according to claim 2, wherein a training algorithm determines whether a monitoring probe has generated information that results in values for the difference values outside a predetermined tolerance value.

4. A method according to claim 3, wherein monitoring probes identified as exceeding the predetermined tolerance value are reported to a fault diagnosis processor.

5. A method according to claim 1, in which resources are selected for use according to the measured properties, and wherein only measurements which are determined to have met a predetermined level of similarity with each other are used for such selection.

6. A method according to claim 1, wherein the monitors include at least one active monitor, which actively polls resources for live data relating to their performance, and at least one passive monitor which acts on live data received from the network without such polling, wherein an active monitor is selected to be the first monitor, which defines reference measurements against which measurements from the other monitors are compared.

7. A computer program element comprising computer program code to, when loaded into a computer system and executed thereon, cause the computer to perform the steps of a method as claimed in claim 1.

8. A networked component adapted to determine a measure of reliability of one or more individual monitors that concurrently measure a predetermined property of a predetermined resource in a network, comprising:
   a reliability computation engine for determining a reliability measurement for a property of a resource, having measurement receivers, concurrently taking measurements of a predetermined resource using a plurality of monitors,
   a selector for selecting one of the plurality of monitors as a first monitor for obtaining live data when taking measurements, which are defined as reference measurements,
   a comparator for determining the difference value between each of the reference measurements and corresponding measurements taken from each of the other monitors when obtaining live data, and
   a reliability value generator for deriving a value for reliability of the measured property of the resource from the said difference values so determined.

9. A networked component according to claim 8, further comprising a consistency weighting generator for generating a measure of consistency between a plurality of measurements.

10. A networked component according to claim 9, wherein the consistency weighting generator determines how often each of the monitors has generated information which is inconsistent with measurements taken by other monitors.

11. A networked component according to claim 9, further comprising an output from the consistency weighting generator to a fault diagnosis processor.

12. A networked component according to claim 8, wherein the monitors include at least one active monitor, which actively polls resources for live data relating to their performance, and at least one passive monitor which acts on live data received from the network without such polling, wherein an active monitor is selected to be the first monitor, which defines reference measurements against which measurements from the other monitors are compared.

* * * * *